Aug. 27, 1968  B. J. RAGAN ET AL  3,398,846
BUMPER MOUNTED SPARE TIRE CARRIER
Filed Sept. 12, 1966
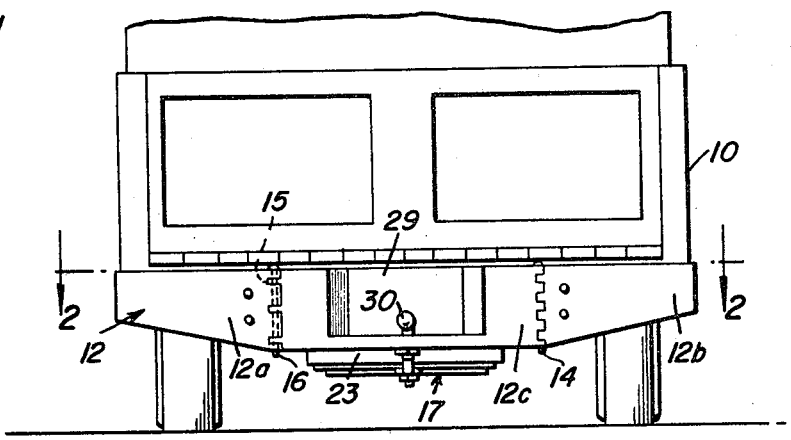
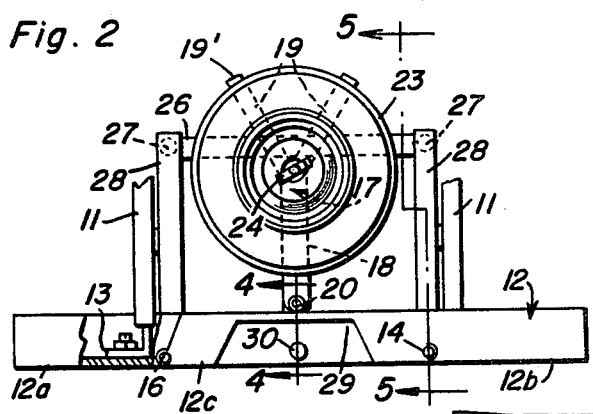
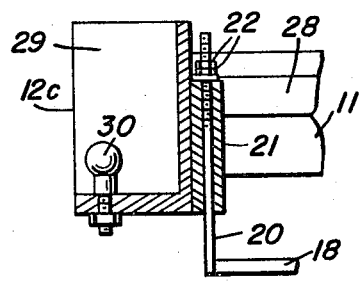
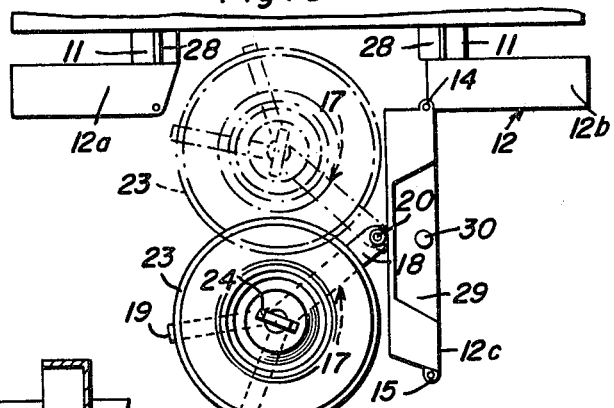
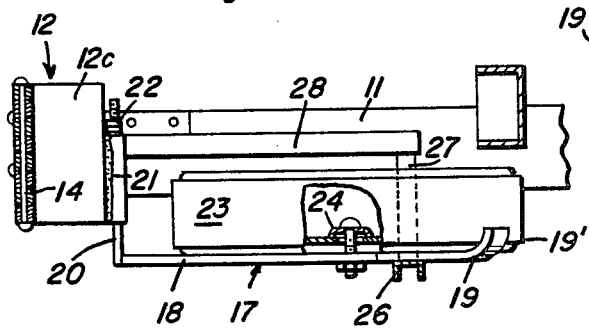
Billie J. Ragan
Vincent A. Beevers
INVENTORS
BY Clarence A. O'Brien
and Harvey B. Jacobson
Attorneys United States Patent Office 3,398,846
Patented Aug. 27, 1968

3,398,846
BUMPER MOUNTED SPARE TIRE CARRIER
Billie J. Ragan, 120 Withington St., and Vincent A. Beevers, 6249 W. 2nd St., both of Rio Linda, Calif. 95673
Filed Sept. 12, 1966, Ser. No. 578,684
8 Claims. (Cl. 214—454)

ABSTRACT OF THE DISCLOSURE

A bumper assembly extending between the closely spaced apart rear ends of the side rails of a pickup truck frame and including a center section extending between the side rails and supported at one end for horizontal swinging about a vertical axis, the center section of the bumper including a support arm having one end pivotally supported therefrom generally centrally intermediate the opposite ends of the center section for oscillation relative to the latter and for reception of the free end of the support arm between the side members of the truck frame and provided with spare tire support means adapted to support a spare tire therefrom.

---

This invention relates to new and useful improvements in spare tire carriers for motor vehicles, particularly pickup trucks, and the like, wherein the spare tire is usually stored between side members of the frame or chassis in advance of the rear bumper.

In such an environment it is known to support the spare tire carrier by the rear bumper and to pivotally attach the bumper to the chassis for outward, horizontal swinging movement, so that when the bumper is swung outwardly, the carrier is swung outwardly therewith and convenient access to the tire on the carrier may be had.

While this conventional arrangement is generally satisfactory in instances where the side members of the frame are spaced apart sufficiently to allow clearance for the spare tire during swinging movement of the carrier and bumper about the bumper pivot, currently manufactured models of pickup trucks do not have such adequate spacing between the frame side members and sufficient clearance does not exist to permit the aforementioned conventional tire carrier arrangement to be utilized.

It is, therefore, the principal object of this invention to overcome this condition and facilitate pivotal bumper mounting of the tire carrier even in instances where the transverse spacing between the side members of the frame is only an inch or two greater than the diameter of the tire.

This object is attained by the provision of means for pivotally attaching the tire carrier to a bumper section which, in itself, is pivotally mounted, so that by virtue of the compound pivotal action, the tire carrier may be efficiently moved or translated between its storage and exposed positions.

The invention also provides means for supportably engaging the tire carrier in its storage position between the frame side members, and another feature of the invention resides in the provision of means for vertically adjusting the pivotal connection of the tire carrier to the bumper section, so that the tire carrier in its storage position may come into proper engagement with the supporting means.

The device of the invention is simple in construction, convenient and dependable in operation, lends itself to economical manufacture, and may be readily utilized on pickup trucks as well as other motor vehicles of similar types.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary rear elevational view of a pickup truck embodying the spare tire carrier of the invention;

FIGURE 2 is a fragmentary horizontal sectional view, taken substantially in the plane of the line 2—2 in FIGURE 1 and illustrating the tire carrier in its storage position;

FIGURE 3 is a fragmentary view, similar to that shown in FIGURE 2, but illustrating the carrier in its withdrawn or exposed position;

FIGURE 4 is an enlarged, fragmentary sectional detail, taken substantially in the plane of the line 4—4 in FIGURE 2; and FIGURE 5 is a fragmentary sectional detail, taken substantially in the plane of the line 5—5 in FIGURE 2.

Referring now to the accompanying drawings in detail, the reference numeral 10 designates a motor vehicle, as for example, a pickup truck, having a frame or chassis which includes a pair of transversely spaced side members 11 and a rear bumper 12 attached thereto, as for example, by suitable angle brackets 13.

The bumper 12 is composed of a plurality of sections, namely, a pair of outer sections 12a, 12b, which are rigidly secured to the vehicle chassis as by the brackets 13, and an intermediate or central section 12c which has one end thereof hingedly or pivotally connected to the section 12b by a vertical pivot pin 14, so that the bumper section 12c may be swung horizontally outwardly from the closed position shown in FIGURE 2 to the open position shown in FIGURE 3. The other, or free end of the bumper section 12c is provided with apertured ears 15 to receive a keeper pin 16 which is slidably and removably positioned in the adjacent end portion of the bumper section 12a, so that when the pin 16 is passed through the ears 15, the central bumper section 12c is locked in its closed position as shown in FIGURE 2.

The spare tire carrier of the invention is designated by the numeral 17, the same being substantially Y-shaped and consisting of a main arm 18 having a pair of divergent arms 19 rigidly secured to one end thereof. The other end of the main arm 18 of the carrier 17 is rigidly secured to a vertical pivot pin 20 which, in turn, is rotatably journaled in a vertical, tubular bearing 21 welded or otherwise secured centrally to the central section 12c of the bumper. As will be noted, the upper end portion of the pin 20 projects from the bearing 21 and is screw-threaded to accommodate a pair of locknuts 22, the purpose of which will be hereinafter described.

The carrier 17 is adapted to receive thereon a spare wheel and tire as indicated at 23, suitable clamping means 24 being provided on the carrier at the junction of the arms 18, 19, for removably retaining the wheel and tire in place. Also, the forward end portions of the carrier arms 19 may be upturned as indicated at 19', to assist in locating the wheel and tire on the carrier while the clamping means 24 are being installed.

When the central bumper section 12c is in its closed position as shown in FIGURE 2, the spare wheel and tire 23 are supported by the carrier 17 in a storage position between the side members 11 of the vehicle chassis. However, when the spare tire is to be used, the bumper section 12c is swung outwardly (after removal of the keeper pin 16) to the open position shown in FIGURE 3, thus moving the carrier 17 and the spare tire outwardly therewith. It is to be particularly noted, however, that since the carrier 17 is swingably connected to the bumper section 12c by the vertical pivot 20, the carrier is capable of horizontal swinging movement about the pivot 20 while the bumper section 12c is swung about the pivot 14, and by virtue of this compound pivotal movement, it is possible to withdraw the carrier and the spare tire from the storage position to the exposed position in substantially a straight line. As a result, it is possible to employ the device of the invention in vehicles wherein the transverse distance or spacing between the chassis side members 11 is only an inch or two greater than the diameter of the tire, which would not be possible if the carrier 17 were fixed rigidly to the bumper section 12c and swung therewith in an arc about the pivot 14.

In order to relieve the strain on the pivot 20 when the carrier is in its storage position, a fixed crossbar is provided to supportably engage the underside of the carrier arms 19 in the stored position of the carrier. The crossbar 26 is rigidly secured to lower ends of vertical posts 27 which, in turn, are supported by horizontal rails 28 suitably secured to the stationary sections 12a, 12b of the bumper. It will be noted that by virtue of the screw-threaded upper end portion of the pivot pin 20, and the provision of the locknuts 22, the pivot pin may be vertically adjusted in the bearing 21, thus correspondingly raising or lowering the carrier 17 so that the arms 19 may properly come into engagement with the supporting crossbar 26 when the carrier is moved to the storage position.

The central portion 12c of the bumper is shown as being provided with a step or recess 29 to accommodate a license plate (not shown) and a trailer hitch 30 in the conventional manner, although it will be appreciated that this feature is merely incidental and not required by the invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a wheeled vehicle including a pair of generally horizontal and horizontally spaced apart elongated structural members having one pair of generally transversely aligned ends, an elongated support member pivotally secured at one end portion for horizontal oscillation about an upstanding axis adjacent one of said ends between a first position extending between said ends and substantially closing the space between said ends and a second position with the other end portion of said support member swung outwardly from the other of said ends, a generally horizontal support arm having one end pivotally supported from said support member intermediate its opposite ends for oscillation relative to said support member about an upstanding axis and with the free end of said support arm projecting outwardly of the side of said support member opposing said space and said free end receivable in said space when said support member is swung to said first position, and spare tire support means carried by the free end of said support arm adapted to support a spare tire of said vehicle therefrom with the latter received, at least partially, in said space between said elongated members.

2. The combination as defined in claim 1 together with a crossbar fixedly mounted between said structural members and supportably engaging the underside of said support means when the latter is in its storage position.

3. The combination as defined in claim 2 wherein said arm is vertically adjustable along its oscillation axis whereby to correspondingly adjust said rack in relation to said crossbar.

4. The combination as defined in claim 2 wherein said support means is substantially Y-shaped and includes a main arm comprising said support arm and a pair of divergent arms rigid with said main arm, said divergent arms being supportably engageable by said crossbar when said support member is in said first position.

5. The combination as defined in claim 4 including a spare wheel clamping means provided on said rack at the junction of said divergent arm.

6. The combination of claim 1 wherein said support member comprises a pivotable center section of a transversely extending bumper extending between and projecting outwardly beyond opposite sides of said ends of said elongated members.

7. The combination of claim 1 wherein said ends are disposed at one end of said vehicle and said support member, when in said first position, is disposed to serve, at least in part, as a bumper member for said one end of said vehicle.

8. The combination of claim 7 wherein said support member includes a trailer hitch member supported therefrom adapted to be utilized in connecting a trailer to said vehicle.

References Cited

UNITED STATES PATENTS

| 1,641,890 | 9/1927 | Jackson | 214—454 |
| 2,574,465 | 11/1951 | Clark | 214—453 |
| 2,635,795 | 4/1953 | White | 214—453 |
| 3,330,431 | 7/1967 | Knecht | 214—454 |

HUGO O. SCHULZ, *Primary Examiner.*